Patented Sept. 11, 1934

1,973,024

UNITED STATES PATENT OFFICE 1,973,024

GREASEWOOD PRODUCT

Urban K. Tarwater, Murrieta, Calif.

No Drawing. Application April 24, 1933, Serial No. 667,615

2 Claims. (Cl. 106—39)

The object of my invention is the production of a plastic adhesive product that can in combination with a liquid, be used in moulding objects like wallboard, statues, boxes, baskets, also filling cavities and cracks in plaster wood, cement etc., and used to produce a plastic adhesive mass, capable of carrying adulterations of comminuted organic or inorganic material. A further object of this invention is a composition of matter comprising comminuted foliage of chenopod (greasewood) varieties growing in the southwestern United States and other places, examples of which are found in a part of the mountain brush near Murrieta, California, and sufficient water to develop a plastic sticky mass which hardens upon drying.

This product can be mixed with a quantity of water sufficient to form a plastic paste or mortar, and develop adhesive qualities which hardens on drying.

I claim,

1. A plastic composition of matter comprising comminuted foliage of greasewood of the Chenopodiacea family and water to produce a plastic mass.

2. An article formed of a moldable composition which comprises comminuted foliage of greasewood of the Chenopodiacea family and water to produce a plastic adhesive mass.

URBAN K. TARWATER.